United States Patent
Klein Antman et al.

(10) Patent No.: US 12,450,141 B2
(45) Date of Patent: Oct. 21, 2025

(54) IDENTIFICATION OF SIMILAR INCIDENTS BASED ON SIMILARITY SCORES

(71) Applicant: Microsoft Technology Licensing, LLC, Redmond, WA (US)

(72) Inventors: Shany Klein Antman, Tel Aviv (IL); Ely Abramovitch, Tel Aviv (IL); Hani Hana Neuvirth, Tel Aviv (IL); Diana Attar-Sityon, Ganey-Tikva (IL); Moshe Israel, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 574 days.

(21) Appl. No.: 17/748,784

(22) Filed: May 19, 2022

(65) Prior Publication Data
US 2023/0376399 A1    Nov. 23, 2023

(51) Int. Cl.
*G06F 21/00*  (2013.01)
*G06F 9/54*   (2006.01)
*G06F 11/30*  (2006.01)
*G06F 18/22*  (2023.01)

(52) U.S. Cl.
CPC .......... *G06F 11/3079* (2013.01); *G06F 9/547* (2013.01); *G06F 11/3075* (2013.01); *G06F 18/22* (2023.01)

(58) Field of Classification Search
CPC .. G06F 9/547; G06F 11/3075; G06F 11/3079; G06F 18/22
See application file for complete search history.

(56) References Cited

U.S. PATENT DOCUMENTS

2019/0268354 A1*  8/2019  Zettel, II ............. H04L 63/1441
2020/0344251 A1* 10/2020  Jeyakumar ........... H04L 51/212

* cited by examiner

*Primary Examiner* — Jeffrey C Pwu
*Assistant Examiner* — Thong P Truong

(57) ABSTRACT

According to examples, an apparatus may include a processor and a memory on which are stored machine-readable instructions that, when executed by the processor, may cause the processor to receive event data for a subject incident. The processor may filter a set of candidate incidents to identify a first predefined number of candidate incidents. The first predefined number of candidate incidents may be filtered based on a respective first similarity score assigned to each of the candidate incidents. The processor may assign a respective second similarity score to each of the identified first predefined number of candidate incidents. The second similarity score may be based on common property values between the subject incident and respective candidate incidents. The processor may identify and output a second predefined number of candidate incidents among the first predefined number of candidate incidents based on the assigned second similarity score.

17 Claims, 7 Drawing Sheets

SECOND SIMILARITY SCORES
500

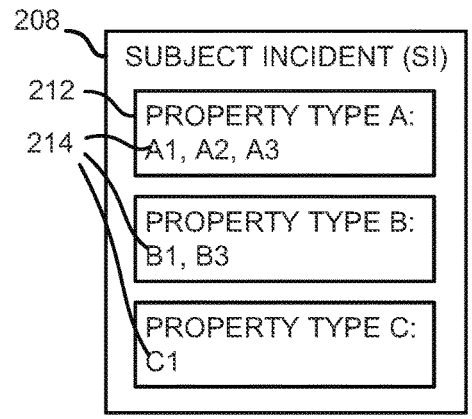

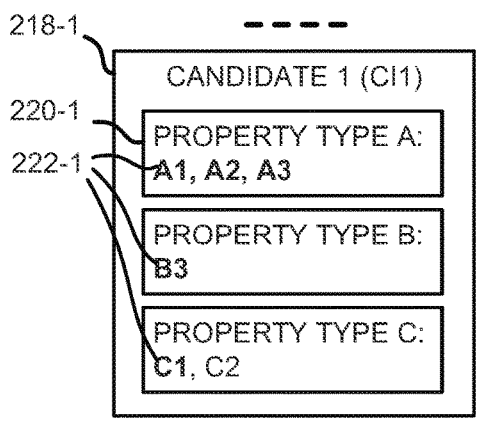

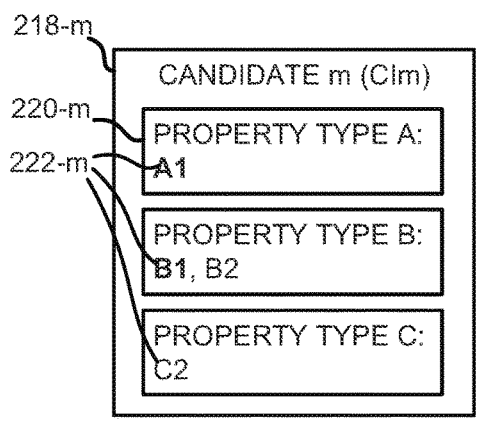

SECOND SIMILARITY SCORE FOR Cx:
= 1 − P(COMMON PROPERTIES)     502

P FOR EACH OF THE PROPERTY VALUES:
TOTAL PROPERTY VALUES: 8
(A1, A2, A3, B1, B2, B3, C1, C2)

228
$P(A1) = 2/8 = 0.250$   $P(B2) = 1/8 = 0.125$
$P(A2) = 1/8 = 0.125$   $P(B3) = 1/8 = 0.125$
$P(A3) = 1/8 = 0.125$   $P(C1) = 1/8 = 0.125$
$P(B1) = 1/8 = 0.125$   $P(C2) = 1/8 = 0.125$

COMMON PROPERTY VALUES FOR SI/CI1:
A1, A2, A3, B3, C1                500-1

SECOND SIMILARITY SCORE (CI1):
= 1 − (P(COMMON PROPERTIES))
= 1 − (P(A1) * P(A2) * P(A3) * P(B3) * P(C1))
= 1 − (2/8 *1/8*1/8*1/8*1/8) = 1 − (2/32,768)
= 0.99994

504
COMMON PROPERTIES FOR SI/CIm:
A1, B1                            500-m

SECOND SIMILARITY SCORE (CIm):
= 1 − (P(COMMON PROPERTIES))
= 1 − (P(A1) * P(B1))
= 1 − (2/8 * 1/8) = 1 − (2/64)
= 0.96875

*FIG. 5*

IDENTIFICATION OF SIMILAR INCIDENTS BASED ON SIMILARITY SCORES

BACKGROUND

Computing devices may receive event data for incidents from data sources to provide various types of services based on the event data, such as for security information and event management services. The received incidents may be similar to previous incidents. In some examples, incidents that may be similar to the received incidents may be manually identified among the previous incidents.

BRIEF DESCRIPTION OF THE DRAWINGS

Features of the present disclosure are illustrated by way of example and not limited in the following figure(s), in which like numerals indicate like elements, in which:

FIG. 5 depicts a block diagram of example second similarity scores for candidate incidents of a first subset of candidate incidents, in which the respective second similarity scores may be based on a probability value for each common property value among properties of the first subset of candidate incidents, in accordance with an embodiment of the present disclosure;

DETAILED DESCRIPTION

Figure 1:
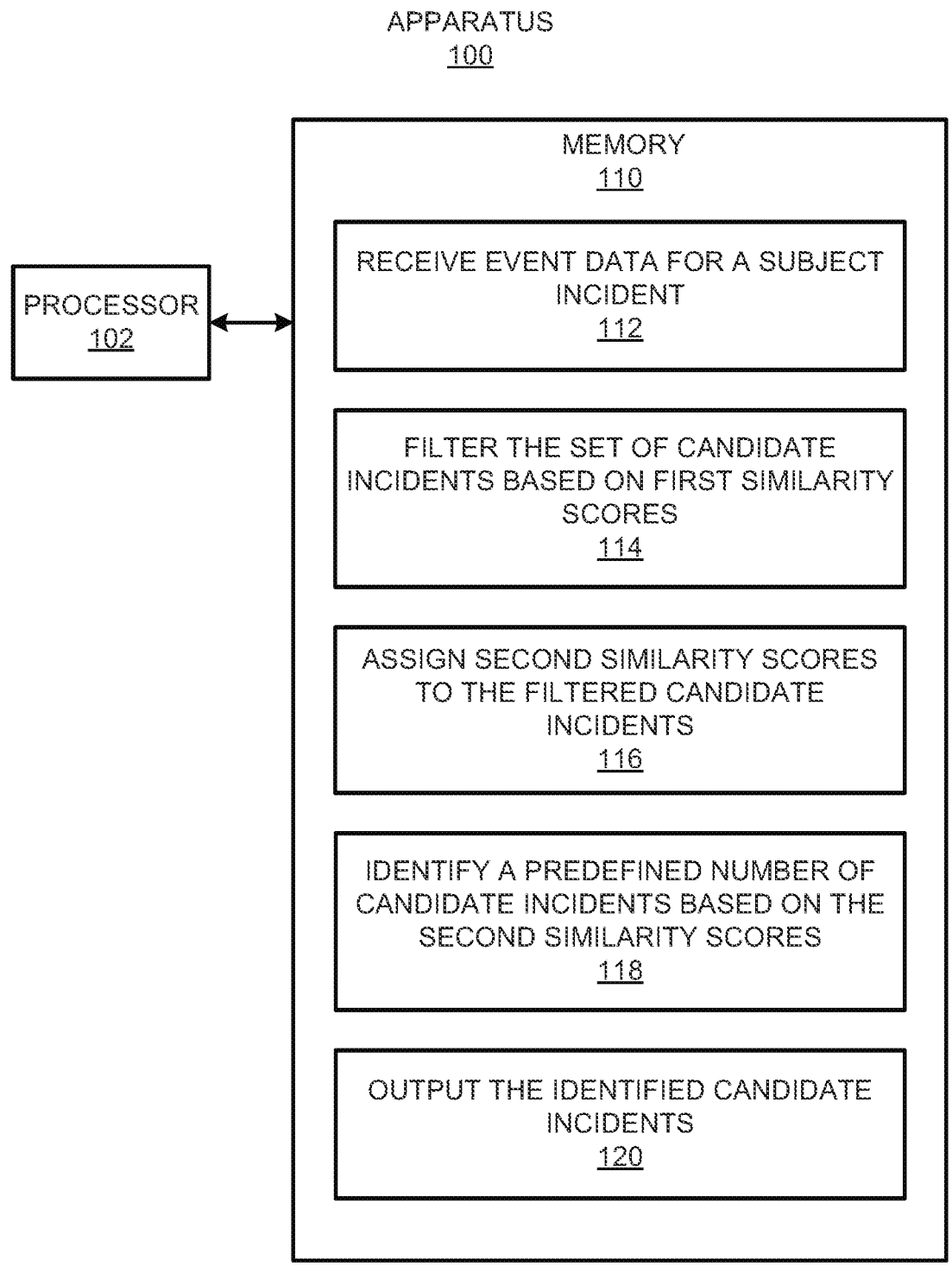
FIG. 1 depicts a block diagram of an apparatus that may identify a predefined number of candidate incidents, among a set of candidate incidents, that may be similar to a subject incident based on similarity scores, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A computing device may receive event data for incidents, such as security incidents from various types of sources. By way of particular example, cloud-based security information and event management (SEM) services may receive relatively large amounts of event data for various types of incidents, such as cyber-attacks, or the like. In some examples, the computing device may be implemented as a security operations center (SOC), and may process the event data to monitor, prevent, detect, investigate, and respond to the incidents. For instance, the event data for the incidents may be presented to an administrator, such as SOC analyst, to be resolved.

In some examples, the incidents may be related to prior incidents, which may be helpful to resolve the incidents. For instance, an incident may be a part of a larger attack, and identification of other incidents that may be a part of the same attack may assist in obtaining the full attack story. In some instances, identification of past similar incidents may be used as a reference to the current incident, which may reduce the mean time to resolve incidents during the investigation process.

A concern associated with identifying similar incidents may be that a relatively large number of incidents, and associated event data, may exist, in which case it may be difficult to identify the similar incidents. In some instances, administrators may manually identify incidents that are similar to subject incidents, which may be relatively time consuming and resource intensive. In other instances, similar incidents may be identified based on common characteristics, such as common entities, common data fields, and/or the like. In these instances, however, a relatively large number of incidents may be identified. For instance, an entity that is relatively more active may generate a relatively large number of incidents. In this case, it may be difficult to determine whether a certain incident from the common entity is more or less relevant to the subject incident than the other identified incidents.

Disclosed herein are apparatuses, systems, methods, and computer-readable media that may enable efficient identification of incidents that are similar to subject incidents. Particularly, a processor may receive event data for a subject incident and may identify candidate incidents from a set of candidate incidents. The processor may filter the set of candidate incidents to identify a first predefined number of candidate incidents. In some examples, the processor may filter the set of candidate incidents based on a respective first similarity score assigned to each of the candidate incidents. The processor may assign a respective second similarity score to each of the identified first predefined number of candidate incidents. The second similarity score may be based on common property values between the subject incident and respective candidate incidents. The processor may identify and output a second predefined number of candidate incidents among the first predefined number of candidate incidents based on the assigned second similarity score.

Through implementation of the features of the present disclosure, a processor may identify reduced candidate incidents pools based on full sets of candidate incidents, which may reduce load on computing resources and improve computation speeds. The processor may identify similar candidate incidents using the candidate incidents pools, which may provide more complete and accurate information regarding the subject incidents, which may reduce the mean time to resolve the subject incidents. A technical improvement afforded through implementation of the features of the present disclosure may be that the speed and accuracy in which managed services may be provided, such as SIEM and SOC services, may be improved, which in turn may reduce energy and resource consumption to resolve incoming incidents.

Figure 2:
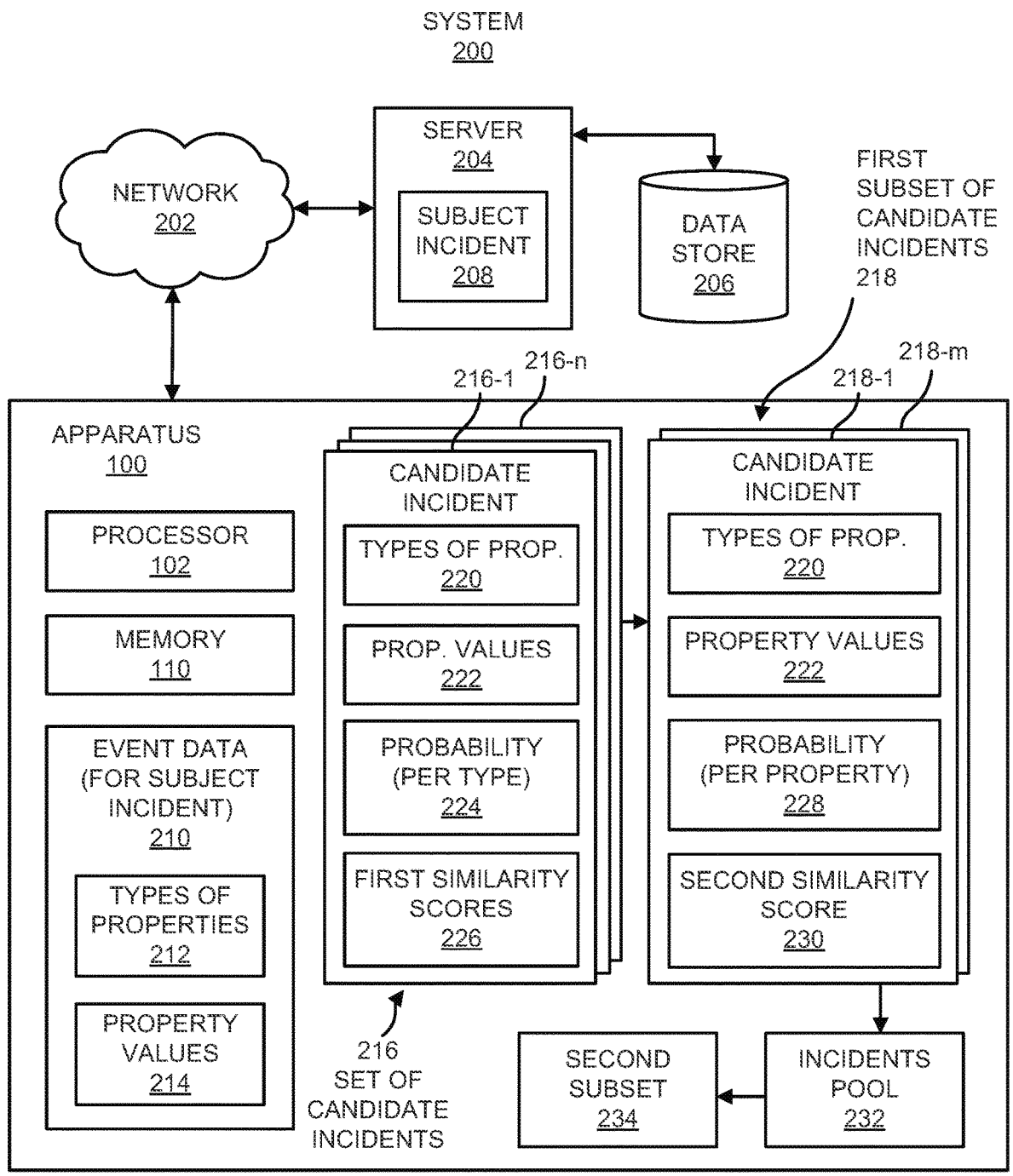
FIG. 2 depicts a block diagram of a system within which the apparatus depicted in FIG. 1 may be implemented, in accordance with an embodiment of the present disclosure.
Figure 3:
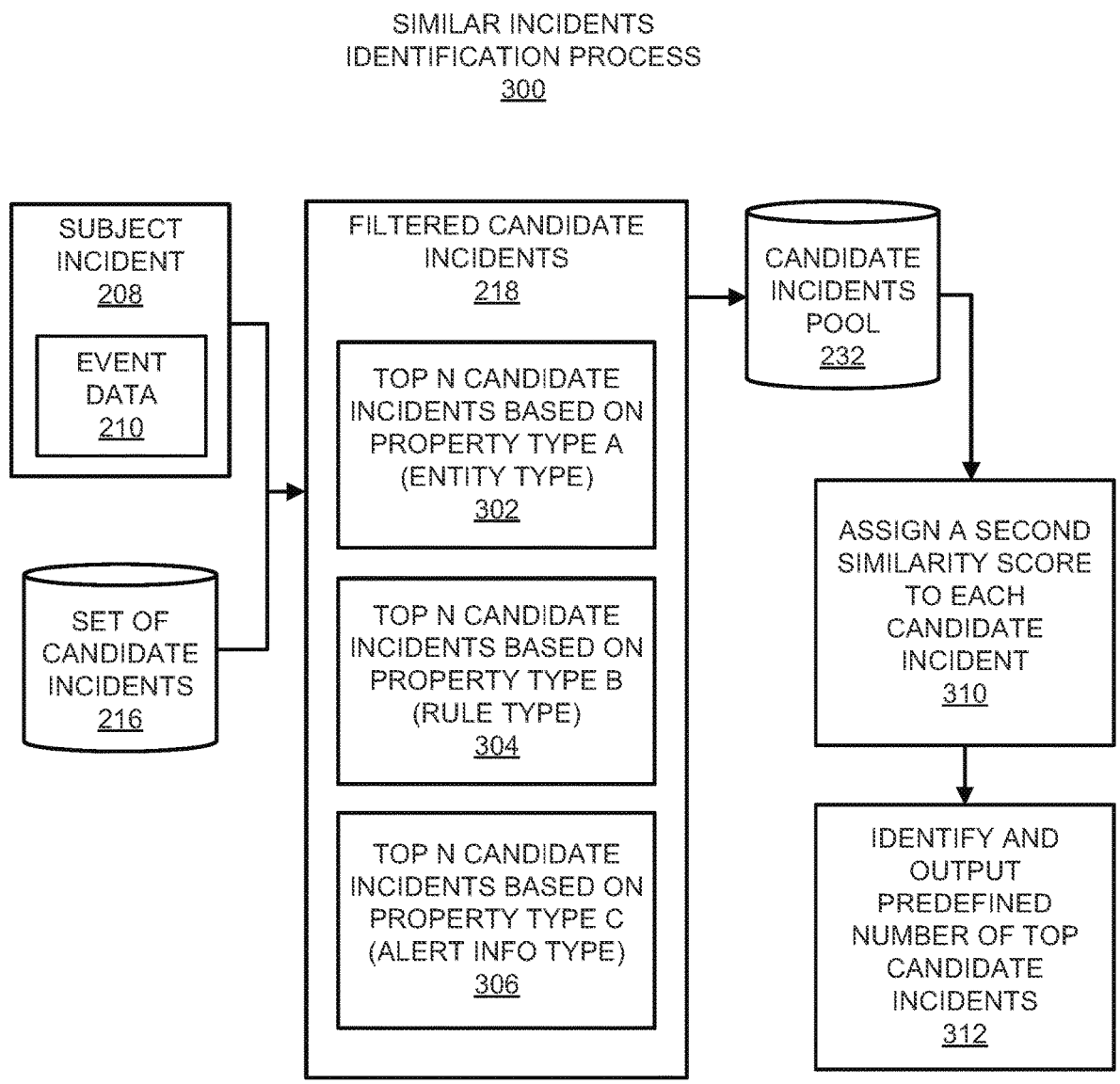
FIG. 3 depicts a flow diagram of a process for identifying a predefined number of candidate incidents that may be similar to a subject incident, including filtering a set of candidate incidents to form a candidate incidents pool and assigning similarity scores to candidate incidents in the candidate incidents pool, in accordance with an embodiment of the present disclosure.

Reference is made to FIGS. 1-5. FIG. 1 shows a block diagram of an apparatus 100 that may identify a predefined number of candidate incidents, among a set of candidate incidents, that may be similar to a subject incident based on similarity scores, in accordance with an embodiment of the present disclosure. FIG. 2 shows a block diagram of an example system 200 within which the apparatus 100 depicted in FIG. 1 may be implemented, in accordance with an embodiment of the present disclosure. FIG. 3 depicts a flow diagram of a process 300 for identifying a predefined number of candidate incidents that may be similar to a subject incident, including filtering a set of candidate incidents to form a candidate incidents pool and assigning similarity scores to candidate incidents in the candidate incidents pool, in accordance with an embodiment of the present disclosure.

Figure 4:
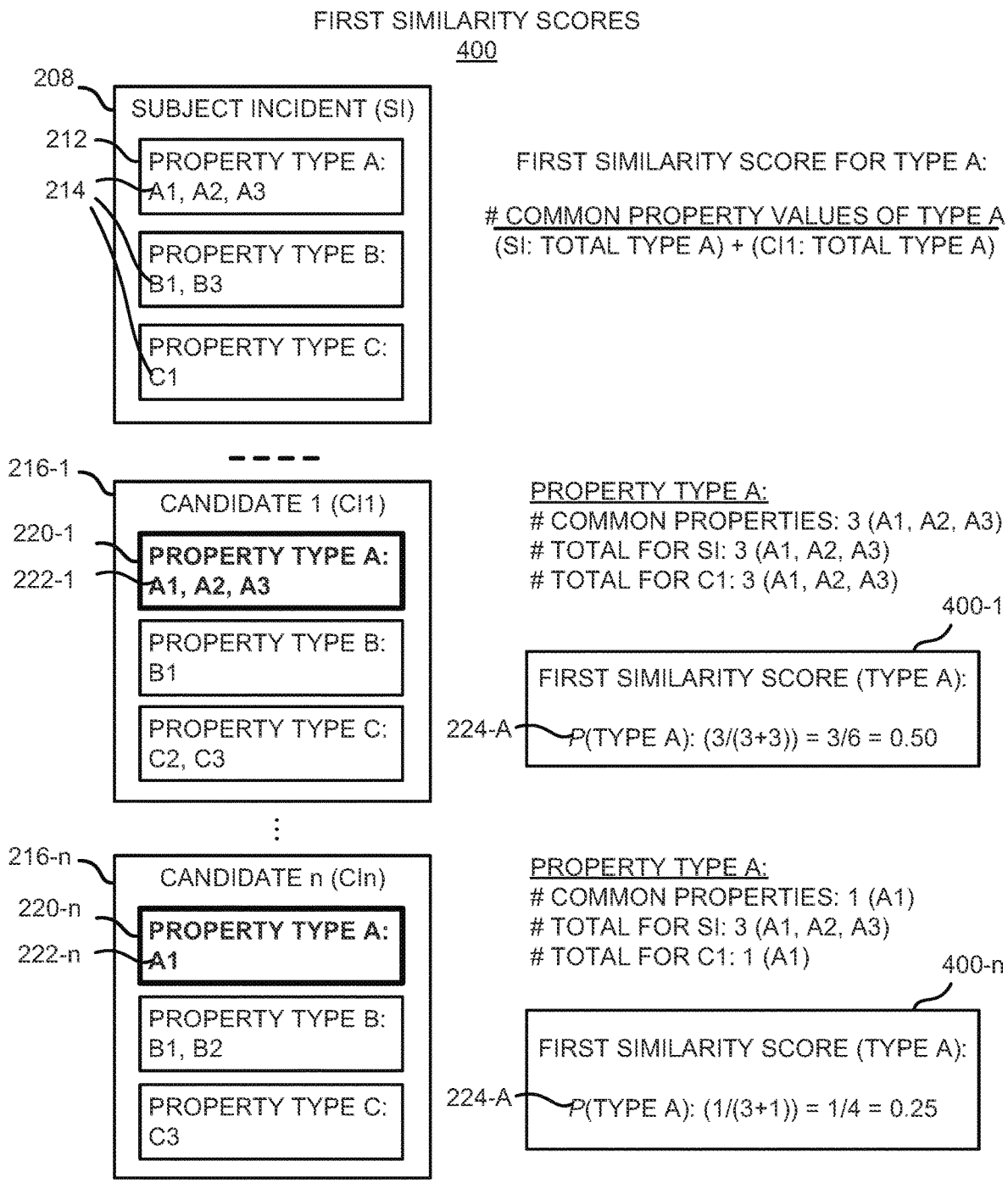
FIG. 4 depicts a block diagram of example first similarity scores for candidate incidents of a set of candidate incidents, in which the first similarity scores may be based on predefined types of properties, in accordance with an embodiment of the present disclosure.

FIG. 4 depicts a block diagram of example first similarity scores 400 for candidate incidents 216-1 to 216-n of a set of candidate incidents 216, in which the first similarity scores 400 may be based on predefined types of properties 220-1 to 220-n, in accordance with an embodiment of the present disclosure. FIG. 5 depicts a block diagram of example second similarity scores 500 for candidate incidents 218-1 to 218-m of a first subset of candidate incidents 218, in which the respective second similarity scores 500 may be based on a probability value 228 for each common property value 222-1 to 222-m among property values 222 of the first subset of candidate incidents 218, in accordance with an embodiment of the present disclosure.

It should be understood that the apparatus 100 depicted in FIG. 1, the system 200 depicted in FIG. 2, the process 300 depicted in FIG. 3, the first similarity scores 400 depicted in FIG. 4, and the second similarity scores 500 depicted in FIG. 5 may include additional features and that some of the features described herein may be removed and/or modified without departing from the scopes of the apparatus 100, the system 200, the process 300, the first similarity scores 400, and/or the second similarity scores 500.

The apparatus 100 may include a processor 102 and a memory 110. The apparatus 100 may be a computing device, including a server, a node in a network (such as a data center or a cloud computing resource), a desktop computer, a laptop computer, a tablet computer, a smartphone, an electronic device such as Internet of Things (IoT) device, and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid stale drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-120 to identify candidate incidents that may be similar to a subject incident. The instructions 112-120 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-120.

The apparatus 100 may be connected via a network 202, which may be the Internet, a local area network, and/or the like, to a server 204. In addition, a data store 206 may be connected to the server 204.

The processor 102 may fetch, decode, and execute the instructions 112 to receive event data 210 for a subject incident 208. An incident as used herein may be defined as an event or a series of events occurring in a network, such as the network 202. The incident may include security events, which may negatively impact the confidentiality, integrity, and/or availability (CIA) of an information system or an organization. In some examples, the incident may include a persistence of events or a sequence of events, such as cyber-attacks, security breaches, and/or the like, that may indicate an ongoing state in the network 202, and which may be opened, closed, or reopened. The subject incident 208 may be a current or incoming incident, and which is to be compared to exiting incidents to identify similarities.

In some examples, the server 204 may maintain data sources (not shown) for the subject incident 208 and the event data 210 for the subject incident 208. The data sources may be computing devices, including nodes in the network 202, such as cloud computing resources, data centers, and/or the like, which may be maintained by the server 204 or multiple servers 204.

The event data 210 may include information regarding the subject incident 208. In some examples, the event data 210 may include predefined types of properties 212 and property values 214 correlated to the predefined types of properties 212.

By way of particular example and for purposes of illustration, the predefined types of properties 212 may include an entity type property 212, a rule type property 212, an alert information type property 212, and/or the like. The entity type property 212 may be associated with various types of entities, and may include usernames, user identifiers, account identifiers, organizations, user roles, addresses such as IP addresses, file hashes, and/or the like.

The rule type property 212 may be associated with rules that may trigger an alert, and to for instance, cause the subject incident 208 to be generated, based on certain conditions, events, and/or the like. By way of particular example and for purposes of illustration, a rule may trigger alerts once a predefined number of failed login attempts have been detected. In other examples, rules may trigger alerts based on detection of certain types of attacks, malicious network traffic, suspicious activities, and/or the like. In some examples, the rules may have unique identifiers, which may be used to identify incidents correlated to the different types of rules.

The alert information type property 212 may include property values in predefined fields, or alert fields, in the event data 210. By way of particular example and for purposes of illustration, the alert information type property 212 may include information regarding the subject incident 208 stored in predefined alert fields, such as a title of the incident, a product name related to the incident, and/or the like. In some examples, the alert information type property 212 may be information in custom fields. The custom fields may have information in a predefined structure, such as in key:value pairs. The key:value pairs may be customized for various types of information, and may include a key that describes the type of property and a correlated value of the property, such as username:value, title:value, product name:value, and/or the like.

The processor 102 may fetch, decode, and execute the instructions 114 to filter a set of candidate incidents 216 to identify candidate incidents 216-1 to 216-n among the set of candidate incidents 216 that may be similar to the subject incident 208. The candidate incidents 216-1 to 216-n may be previously received incidents, which may be resolved or ongoing, and which may be compared to the subject incident 208 to determine a similarity to the subject incident 208. In some examples, the set of candidate incidents 216 may be an incidents database that includes all previous incidents or a subset of the incidents database. The set of candidate incidents 216 may be stored and maintained on the apparatus 100, or alternatively or additionally, across multiple devices over the network 202, such as the server 204 or multiple servers 204.

According to examples, the processor 102 may identify a first subset of candidate incidents 218, which is also referred to herein as a first predefined number of candidate incidents 218, that may be identified as being similar to the subject incident 208 among the set of candidate incidents 216. In some examples, each of the candidate incidents 216-1 to 216-n may include property values 222 and types of properties 220 correlated to the property values 222. The processor 102 may filter the set of candidate incidents 216 based on a similarity between the types of properties 220 and the property values 222 of the candidate incidents 216-1 to 216-n to the types of properties 212 and the property values 214 of the subject incident 208.

According to examples, the processor 102 may calculate a probability value 224 of a common type of property 220 between the subject incident 208 and each of the candidate incidents 216-1 to 216-n. For instance, the processor 102 may calculate, for each type of property 220 in each candidate incident 216-1 to 216-n, the probability value 224 correlated to a certain type of property 220. The processor 102 may calculate the probability value 224 based on a total number of property values 222 of a certain type that are common between the candidate incident 216-1 to 216-n and the subject incident 208, relative to a sum of the total number of property values 214 of the certain type in the subject incident 208 and the total number of property values 222 of the certain type in the candidate incident 216-1 to 216-n.

In some examples, the processor 102 may calculate the respective first similarity scores 226 for the candidate incidents 216-1 to 216-n among the set of candidate incidents 216 based on the probability values 224. For instance, the processor 102 may assign the calculated probability value 224 for a certain type of property 220 as the first similarity score 226 for that type of property 220. The processor 102 may assign a probability value 224 for each type of property 220 included in a particular candidate incident 216-1 to 216-n. The processor 102 may repeat this process for each of the candidate incidents 216-1 to 216-n. As such, in a case in which the set of candidate incidents 216 is to be filtered by three different types of properties 220, the processor 102 may assign three first similarity scores 226 to each of the candidate incidents 216-1 to 216-n.

The processor 102 may filter the set of candidate incidents 216 based on a ranking of the first similarity scores 226 assigned to each of the candidate incidents 216-1 to 216-n to identify the first subset of candidate incidents 218. The processor 102 may form a candidate incidents pool 232 based on the first subset of candidate incidents 218. In some examples, the processor 102 may form the candidate incidents pool 232 to include a predefined number N of candidate incidents 216-1 to 216-n for each type of property 220.

By way of particular example and for purposes of illustration, the processor 102 may filter the set of candidate incidents 216 based on 3 types of properties 220. Referring to FIGS. 3 and 4, the processor 102 may filter the candidate incidents 218 according to a first group 302 that includes the Top N number of candidate incidents 216 based on a Property Type A, such as the entity type property 220, a second group 304 that includes the Top N number of candidate incidents 216 based on a Property Type B, such as the rule type property 220, and a third group 306 that includes the Top N number of candidate incidents 216 based on a Property Type C, such as the alert information type property 220. In this case, the Top N number of candidate incidents 216 may be a predefined number N of candidate incidents 216 to be included in each of the groups 302, 304, and 306.

The processor 102 may identify the Top N candidate incidents 218 for the first group 302 based on a ranking of respective first similarity scores 400-1 to 400-n for each of the candidate incidents CI1 to CIn 216-1 to 216-n, depicted in FIG. 4. The first similarity scores 400 may be the same as the first similarity scores 226 depicted in FIG. 2. By way of particular example, the candidate incident CI1 216-1 may include a property type A 220-1, which may be the entity type property 220, and may include property values A1, A2, and A3 222-1. In this example, the candidate incident CI1 216-1 has a total of 3 common properties with respect to the subject incident SI 208, namely A1, A2, and A3. The subject incident SI 208 has a total of 3 property values of type A, A1, A2, and A3, and the candidate incident CI1 216-1 has a total of 3 property values of type A, A1, A2, and A3. The processor 102 may calculate the first similarity score 400-1 for property type A 220-1 based on a probability value 224-A of the common type of property, property type A 220-1, among predefined types of properties 220, between the subject incident 208 and the candidate incident CI1 216-1. In some examples, the processor 102 may calculate the probability value P(TYPE A) 224-A for property type A according to the following equation:

$$\frac{\text{\# of Common Property Values of Type } A}{(\text{\# of Type } A \text{ Property Values in } SI) + (\text{\# of Type } A \text{ Property values in } CI1)}$$

Based on the equation above, the probability value P(TYPE A) 224-A may be calculated to be 3/6, or 0.50, as depicted in FIG. 4. The processor 102 may assign the probability value P(TYPE A) 224-A as the first similarity score 400-1 for the candidate incident 216-1.

The processor 102 may calculate the first similarity scores 400-2 to 400-$n$ for the property type A 220 for each of the candidate incidents 216-2 to 216-$n$ in the same manner. Once the first similarity scores 400-1 to 400-$n$ for property type A for each of the candidate incidents 216-2 to 216-$n$ are calculated, the processor 102 may rank the candidate incidents 216-1 to 216-$n$ based on the first similarity scores 400-1 to 400-$n$. The processor 102 may filter the set of candidate incidents 216 based on the ranking to identify the first group 302 of top N candidate incidents. The second group 304 of the top N candidate incidents based on the Property Type B and the third group 306 of the top N candidate incidents based on the Property Type C may be identified in the same manner. The processor 102 may form the candidate incidents pool 232 based on the filtered groups 302, 304, and 306 of candidate incidents 216.

According to examples, the predefined number N of candidate incidents 216-1 to 216-$n$ for each type of property 220 may be the same as each other. In some examples, the predefined number N of candidate incidents 216-1 to 216-$n$ may be set to be within a predefined range of each other. For instance, in some cases, the number of available candidate incidents 216-1 to 216-$n$ for a certain type of property 220 may be insufficient to reach the predefined number of candidate incidents 216-1 to 216-$n$. As such, in some instances, the number of candidate incidents 216-1 to 216-$n$ correlated to one type of property 220 may be different than a number of candidate incidents 216-1 to 216-$n$ for another type of property 220. However, a relatively large difference in the number of candidate incidents 216-1 to 216-$n$ between the different types of properties 220 may skew representation in the candidate incidents pool 232, which may affect similarity determinations. As such, in some examples, the predefined number N of candidate incidents 216-1 to 216-$n$ for each type of property 220 may be set to be within a predefined range of each other. For instance, the predefined number N of candidate incidents 216-1 to 216-$n$ for each type of property 220 may be set to be between an upper threshold limit, such as the predefined number N, and a predefined range within the upper threshold limit. In some examples, the predefined range may be set to be a predefined percentage of the upper threshold limit. The value of the predefined range may be determined based on prior knowledge, experimentation, testing, modeling, and/or the like.

In some examples, in instances in which multiple candidate incidents 216-1 to 216-$n$ are determined to have the same probability value 224, such as when candidate incidents 216-1 to 216-$n$ have the same property values 222, the processor 102 may sort or re-order the equally ranked candidate incidents 216-1 to 216-$n$. In some examples, the processor 102 may sort the equally ranked candidate incidents 216-1 to 216-$n$ based on an amount of time between generation of the subject incident 208 and generation of each of the equally ranked candidate incidents 216-1 to 216-$n$. For instance, a candidate incident 216-1 to 216-$n$ that is generated closer in time to the subject incident 208 may be relatively more relevant, and thus the processor 102 may sort this candidate incident 216-1 to 216-$n$ to have a higher ranking. In some examples, the processor 102 may adjust the first similarity scores 226 for equally ranked candidate incidents 216-1 to 216-$n$ such that a first similarity score 226 for a candidate incident 216-1 to 216-$n$ that is generated closer in time to the subject incident 208 may be weighted to have a relatively greater value.

The processor 102 may fetch, decode, and execute the instructions 116 to assign a respective second similarity score 230 to each candidate incident 218-1 to 218-$m$ of the identified first subset of candidate incidents 218. The second similarity scores 230 may correlate to a similarity between respective candidate incidents 218-1 to 218-$n$ in the first subset of candidate incidents 218 and the subject incident 208. In some examples, the processor 102 may calculate the respective second similarity score 230 for each of the candidate incidents 218-1 to 218-$m$ based on respective probability values 228 calculated for each of the candidate incidents 218-1 to 218-$m$. The probability values 228 may be based on a frequency of each of the common property values 222 among the property values 222 of the candidate incidents 218 in the candidate incidents pool 232.

By way of particular example and for purposes of illustration, the processor 102 may determine a first property value 222, such as the property value A1 222-$m$ depicted in FIG. 5, and a second property value 222, such as the property value B1, 222-$m$, as being the common property values between the subject incident 208 and the candidate incident 218-$m$ of the first subset of candidate incidents 218, such as the common property values 504 that may include A1 and B1. In this particular example, the processor 102 may calculate a first probability value P(A1) 228 for presence of the first property value A1 among all property values 222 of the first subset of candidate incidents 218. The processor 102 may calculate a second probability value P(B1) 228 for presence of the second property value 222 among all property values 222 of the first subset of candidate incidents 218. The processor 102 may calculate the assigned second similarity score 500-$m$ for the candidate incident 218-$m$ based on a product of the first probability value P(A1) 228 and the second probability value P(B1) 228, which may be calculated in this particular example as P(COMMON PROPERTIES)=2/64.

In some examples, the assigned second similarity score 500-$m$ may be inversely proportional to a probability value 502 for the common property values 504, A1 and B1, between the subject incident 208 and respective ones of the first subset of candidate incidents 218. For instance, the processor 102 may calculate the second similarity score 500-$m$ as being (1−the probability value 502).

In some examples, the processor 102 may calculate other second similarity scores 230, such as the second similarity score 500-1 for the candidate incident 218-1 in the same manner as previously described with respect to the second similarity score 500-$m$ for the candidate incident 218-$m$.

The processor 102 may fetch, decode, and execute the instructions 118 to identify a second subset of candidate incidents 234, also referred to herein as a second predefined number of candidate incidents 234, among the first subset of candidate incidents 218. The processor 102 may identify the second subset of candidate incidents 234 from the first subset of candidate incidents 218 based on the assigned second similarity scores 230. In some examples, the processor 102 may rank the candidate incidents 218-1 to 218-$m$ based on the respective second similarity score 230 for each of the first subset of candidate incidents 218. The processor 102 may identify the second subset of candidate incidents 234 based on the ranking.

In some examples, the processor 102 may sort or order the ranked candidate incidents 218-1 to 218-$m$ based on another property, such as a time at which the ranked candidate incidents 218-1 to 218-$m$ were generated. For instance, multiple candidate incidents 218-1 to 218-$m$ may have the same property values 222 in common with the property values 214 of the subject incident 208, and thus these candidate incidents 218-1 to 218-*m* may have the same second similarity score 230. As such, the processor 102 may sort equally ranked candidate incidents 218-1 to 218-*m* based on an amount of time between generation of the subject incident 208 and generation of each of the equally ranked candidate incidents 218-1 to 218-*m*. In some examples, the processor 102 may order the ranked candidate incidents 218-1 to 218-*m* based on certain property values 222 such as entities, rules, alert fields, and/or the like.

The processor 102 may fetch, decode, and execute the instructions 120 to output the second subset of candidate incidents 234. In some examples, the second subset of candidate incidents 234 may be output to a graphical user interlace (not shown), such as a web interface, together with the subject incident 208. In some examples, the processor 102 may output various information about each of the candidate incidents 234, such as the second similarity scores 230, the names of the candidate incidents 234, reasons for which the candidate incidents 234 were identified as being similar, such as having similar entities, similar rules, similar alert field values, similar time of generation, shared threat indicators, shared anomalies, and/or the like.

Figure 6:
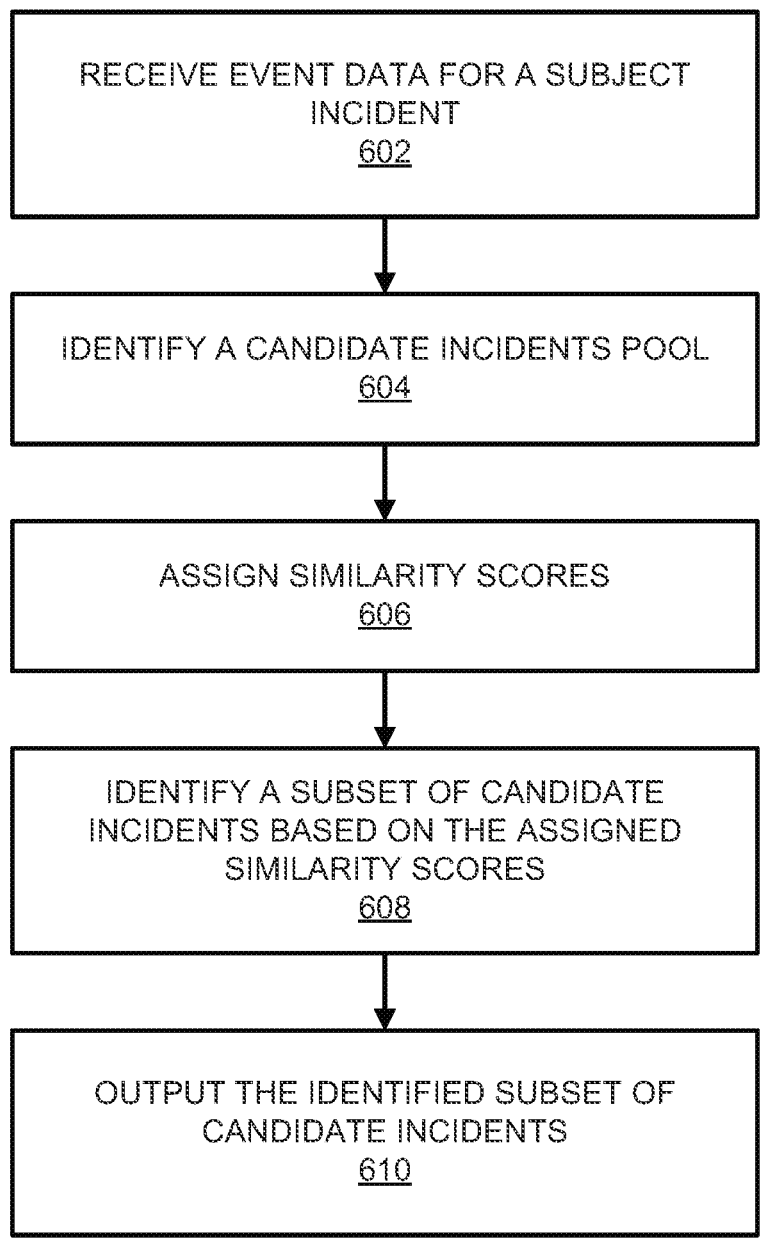
FIG. 6 depicts a flow diagram of a method for identifying a subset of candidate incidents from a candidate incidents pool based on an assigned similarity score, in accordance with an embodiment of the present disclosure.

Various manners in which a processor implemented on the apparatus 100 may operate are discussed in greater detail with respect to the method depicted in FIG. 6. FIG. 6 depicts a flow diagram of a method 600 for identifying a subset of candidate incidents 234 from a candidate incidents pool 232 based on an assigned similarity score 230, in accordance with an embodiment of the present disclosure. It should be understood that the method 600 depicted in FIG. 6 may include additional operations and that some of the operations described therein may be removed and/or modified without departing from the scope of the method 600. The description of the method 600 is made with reference to the features depicted in FIGS. 1 to 5 for purposes of illustration.

At block 602, the processor 102 may receive event data 210 for a subject incident 208. In some examples, the server 204 may maintain data sources (not shown) for the event data 210. The event data 210 may include types of properties 212 and property values 214 of the subject incident 208.

At block 604, the processor 102 may identify a candidate incidents pool 232 from a set of candidate incidents 216. The candidate incidents pool 232 may include a predefined number of candidate incidents 216 for each type of property 220 among predefined types of properties 220 associated with the candidate incidents 218, such as the groups 302, 304, and 306 of candidate incidents 216 based on the types of properties 220.

At block 606, the processor 102 may assign a respective similarity score, such as the second similarity score 230, to each of the candidate incidents 218 among the predefined number of candidate incidents 216, such as those in the groups 302, 304, and 306, in the candidate incidents pool 232. The similarity score 230 may be based on common property values 222 between the subject incident 208 and respective candidate incidents 218 in the candidate incidents pool 232.

At block 608, the processor 102 may identify a subset of candidate incidents 234 from the candidate incidents pool 232 based on the assigned similarity score 230. At block 610, the processor 102 may output the identified subset of the candidate incidents 234.

In some examples, the processor 102 may identify the candidate incidents pool 232 based on the respective probability values 224 for the common types of properties 220 between the subject incident 208 and the candidate incidents 216-1 to 216-*n* in the set of candidate incidents 216. The candidate incidents pool 232 may include a predefined number of candidate incidents 218 in the respective groups 302, 304, and 306 for each type of property 220 among predefined types of properties 220.

According to examples, the candidate incidents pool 232 may be the same as the first subset of candidate incidents 218. In some examples, the processor 102 may modify the first subset of candidate incidents 218 to form the candidate incidents pool 232. For instance, duplicates among the candidate incidents 218-1 to 218-*m* may exist in the first subset of candidate incidents 218, for instance in a case in which a certain candidate incident 218-1 to 218-*n* is a Top N candidate incident 218 in the first group 302 based on a first type of property 220 as well as a Top N candidate incident 218 in the second group 304 based on a second type of property 220. In these instances, the processor 102 may remove the duplicates among the candidate incidents 218-1 to 218-*m* from the first subset of candidate incidents 218 before forming the candidate incidents pool 232.

The predefined number N of candidate incidents 216 for each type of property 220, for instance in the groups 302, 304, and 306, may be within a predefined range of each other. For instance, in some cases, the number of available candidate incidents 216-1 to 216-*n* for a particular type of property 220 may be less than the predefined number of candidate incidents 216-1 to 216-*n*. However, relatively large differences in the predefined number N of candidate incidents 216 in groups 302, 304, and 306 between the different types of properties 220 may skew representation in the candidate incidents pool 232, which may affect the accuracy of the second similarity scores 230. As such, in some examples, the number of candidate incidents 216 in each of the groups 302, 304, and 306 may be set to be between an upper threshold limit, such as the predefined number N, and a predefined range within the upper threshold limit. The value of the predefined range may be determined based on prior knowledge, experimentation, testing, modeling, and/or the Ike.

According to examples, the processor 102 may calculate the respective similarity score 230 for each of the predefined number N of candidate incidents 216 in the groups 302, 304, and 306 based on a probability value 228 for each of the common property values 222 among property values 222 in the candidate incidents pool 232.

According to examples, the processor 102 may determine a first property value A1 222-*m* and a second property value B1 222-*m*, depicted in FIG. 5, as being the common property values between the subject incident 208 and a candidate incident 218-*m* of the candidate incidents pool 232. The processor 102 may calculate a first probability value P(A1) 228 for presence of the first property value A1 220-*m* among all of the property values 222 of the predefined number of candidate incidents, such as the candidate incidents CI1 and CI2 in the candidate incidents pool 232, as depicted in FIG. 5. The processor 102 may calculate a second probability value P(B1) for presence of the second property value B1 222-*m* among all of the property values 222 of the predefined number of candidate incidents CI1 and CIm in the candidate incidents pool 232. The processor 102 may calculate the assigned similarity score 230-*m* for the first candidate incident CIm 218-*m* based on a product of the first probability value P(A1) and the second probability value P(B1).

In some examples, the processor 102 may modify the assigned similarity score 230-*m* to be inversely proportional to a probability value for the common property values P(COMMON PROPERTIES) between the subject incident 208 and respective ones of the predefined number of candidate incidents CI1, CIm in the candidate incidents pool 232.

In some examples, the processor 102 may rank the predefined number of candidate incidents 218-1 and 218-$m$ in the candidate incidents pool 232 based on the assigned similarity score 230 for each of the predefined number of candidate incidents 218-1 and 218-$m$ in the candidate incidents pool 232. The processor 102 may sort sorting equally ranked candidate incidents 218-1 and 218-$m$ in the ranking based on an amount of time between generation of the subject incident and generation of each of the equally ranked candidate incidents. The processor 102 may identify the subset of candidate incidents 234 from the candidate incidents pool 232 based on the ranking.

Some or all of the operations set forth in the method 600 may be included as utilities, programs, or subprograms, in any desired computer accessible medium. In addition, the method 600 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 7:
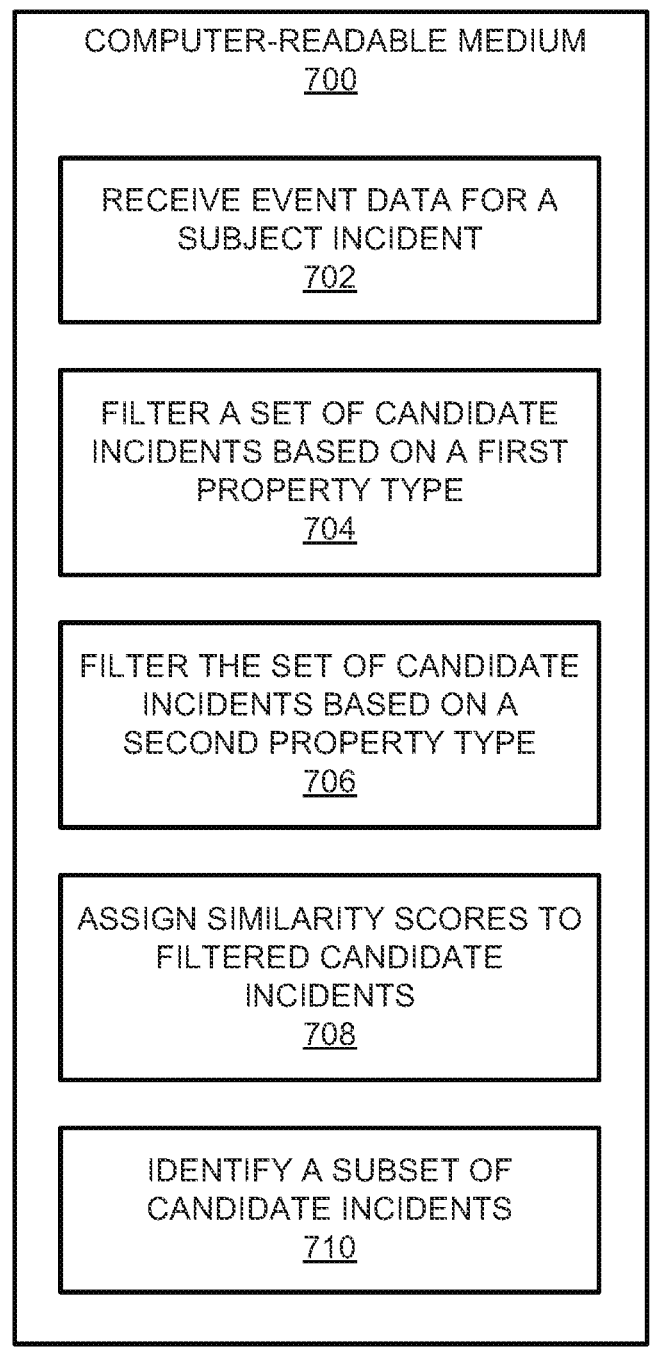
FIG. 7 depicts a block diagram of a computer-readable medium that may have stored thereon computer-readable instructions to identify a subset of candidate incidents from a candidate incidents pool based on a ranking according to assigned similarity scores, in accordance with an embodiment of the present disclosure.

Turning now to FIG. 7, there is shown a block diagram of a computer-readable medium 700 that may have stored thereon computer-readable instructions to identify a subset of candidate incidents 234 from a candidate incidents pool 232 based on a ranking according to assigned similarity scores, in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The description of the computer-readable medium 700 is made with reference to the features depicted in FIGS. 1 to 5 for purposes of illustration. The computer-readable medium 700 may be a non-transitory computer-readable medium. The term "non-transitory" does not encompass transitory propagating signals.

The computer-readable medium 700 may have stored thereon machine-readable instructions 702-710 that a processor disposed in an apparatus 100 may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to receive event data 210 for a subject incident 208. In some examples, the server 204 may maintain data sources (not shown) for the subject incident 208 and the event data 210 for the subject incident 208. The data sources may be cloud-based data warehouses, data centers, and/or the like, which may be maintained by the server 204 or multiple servers 204.

The processor may fetch, decode, and execute the instructions 704 to filter a set of candidate incidents 216 based on a first property type 220 to identify a first predefined number of candidate incidents 216, such as the first group 302, correlated to the first property type 220.

The processor may fetch, decode, and execute the instructions 706 to filter the set of candidate incidents 216 based on a second property type 220 to identify a second predefined number of candidate incidents 216, such as the second group 304, correlated to the second property type. The first predefined number of candidate incidents in the first group 302 and the second predefined number of candidate incidents in the second group 304 may form a candidate incidents pool 232.

The processor may fetch, decode, and execute the instructions 708 to assign a respective similarity score, such as the second similarity score 230, to each of the candidate incidents 218 in the candidate incidents pool 308. The similarity score 230 may be based on a respective probability value 228 for each of the property values 222 among the property values 222 of the candidate incidents 218 in the candidate incidents pool 232.

The processor may fetch, decode, and execute the instructions 710 to identify a subset of candidate incidents 234 from the candidate incidents pool 232 based on a ranking according to the assigned similarity score 230.

In some examples, the processor may calculate the respective first similarity scores 226 for the first predefined number of candidate incidents 216 in the first group 302 correlated to the first property type 220. The first similarity scores 226 of the candidate incident 218-1 to 218-$m$ may be based on a probability value 228 of the first property type 220 between the subject incident 208 and the candidate incident 218-1 to 218-$m$. In some examples, the processor may filter the set of candidate incidents 216 to identify the first predefined number N of candidate incidents 216 in the first group 302 using the calculated first similarity scores 226.

In some examples, the processor may determine a first property value 222, such as property value A1 222-$m$ depicted in FIG. 5, and a second property value 222, such as property value B1 222-$m$ depicted in FIG. 5, as being common property values 222 between the subject incident 208 and a first candidate incident, such as candidate incident 218-$m$ (CIm) among the candidate incidents pool 232. The processor may calculate a first probability value 228, such as the probability value P(A1) 228, for presence of the first property value A1 222-$m$ among all property values 222 of the candidate incidents 218 in the candidate incidents pool 232. The processor may calculate a second probability value 228, such as the probability value P(B1) 228, for presence of the second property value B1 222-$m$, among all property values 222 of the candidate incidents 218 in the candidate incidents pool 232. The processor may calculate the assigned similarity score 230-$m$ for the first candidate incident CIm 218-$m$ based on a product of the first probability value P(A1) 228 and the second probability value P(B1) 228.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising: a processor; and
a memory on which is stored machine-readable instructions that when executed by the processor, cause the processor to:
receive event data for a subject incident;
calculate respective first similarity scores for candidate incidents, the first similarity score for a candidate incident being based on a probability value of a common type of property among predefined types of properties between the subject incident and the candidate incident;
filter the candidate incidents to identify a first predefined number of candidate incidents that are similar to the subject incident, the first predefined number of candidate incidents being filtered based on the calculated respective first similarity scores for the candidate incidents;
assign a respective second similarity score to each of the candidate incidents in the identified first predefined number of candidate incidents, the second similarity score for a candidate incident being based on common property values between the subject incident and the candidate incident among the identified first predefined number of candidate incidents, wherein the second similarity score is inversely proportional to a probability value for the common property values between the subject incident and respective ones of the candidate incidents in the identified first predefined number of candidate incidents
identify a second predefined number of candidate incidents among the first predefined number of candidate incidents based on the second similarity score assigned to the candidate incidents in the identified first predefined number of candidate incidents; and
output the identified second predefined number of candidate incidents.

2. The apparatus of claim 1, wherein the instructions further cause the processor to:
form a candidate incidents pool including the identified first predefined number of candidate incidents, wherein the candidate incidents pool includes a predefined number of candidate incidents for each type of property among the predefined types of properties.

3. The apparatus of claim 2, wherein the predefined number of candidate incidents for each type of property among the predefined types of properties are within a predefined range of each other.

4. The apparatus of claim 2, wherein the predefined types of properties include an entity type property, a rule type property, an alert information type property, or a combination thereof.

5. The apparatus of claim 1, wherein the instructions further cause the processor to:
calculate the respective second similarity score for each of the candidate incidents in the identified first predefined number of candidate incidents, the second similarity score for a candidate incident in the identified first predefined number of candidate incidents being based on a probability value for each of the common property values among property values of the candidate incidents in the identified first predefined number of candidate incidents.

6. The apparatus of claim 1, wherein the instructions further cause the processor to:
determine a first property value and a second property value as being the common property values between the subject incident and a first candidate incident of the identified first predefined number of candidate incidents;
calculate a first probability value for presence of the first property value among all properties of the identified first predefined number of candidate incidents;
calculate a second probability value for presence of the second property value among all properties of the identified first predefined number of candidate incidents; and
calculate the assigned second similarity score for the first candidate incident based on a product of the first probability value and the second probability value.

7. The apparatus of claim 1, wherein the instructions further cause the processor to:
rank the candidate incidents in the identified first predefined number of candidate incidents based on the assigned second similarity scores of the candidate incidents in the identified first predefined number of candidate incidents; and
identify the second predefined number of candidate incidents based on the ranking.

8. The apparatus of claim 7, wherein the instructions further cause the processor to:
sort equally ranked candidate incidents based on amounts of time between generation of the subject incident and generation of the equally ranked candidate incidents.

9. A method comprising:
receiving, by a processor, event data for a subject incident;
identifying, by the processor, a candidate incidents pool from a set of candidate incidents, wherein the candidate incidents pool includes a predefined number of candidate incidents for each type of property among predefined types of properties associated with the candidate incidents;
assigning, by the processor, a respective similarity score to each of the candidate incidents among the predefined number of candidate incidents in the candidate incidents pool, wherein:
each of the similarity scores is based on common property values between the subject incident and respective candidate incidents in the candidate incidents pool; and
the similarity score is inversely proportional to a probability value for the common property values between the subject incident and respective ones of the predefined number of candidate incidents in the candidate incidents pool;
identifying, by the processor, a subset of candidate incidents from the candidate incidents pool based on the assigned similarity scores; and
outputting, by the processor, the identified subset of the candidate incidents.

10. The method of claim 9, further comprising:
identifying the candidate incidents pool based on respective probability values for common types of properties between the subject incident and the candidate incidents in the set of candidate incidents.

11. The method of claim 9, wherein the candidate incidents pool includes a predefined number of candidate incidents for each type of property among predefined types of properties, the predefined number of candidate incidents for each type of property being within a predefined range of each other.

12. The method of claim 9, further comprising:
calculating the respective similarity score for each of the predefined number of candidate incidents in the candidate incidents pool based on a probability value for each of the common property values among property values in the candidate incidents pool.

13. The method of claim 9, further comprising:
determining a first property value and a second property value as being the common property values between the subject incident and a first candidate incident of the candidate incidents pool;
calculating a first probability value for presence of the first property value among all properties of the predefined number of candidate incidents in the candidate incidents pool;
calculating a second probability value for presence of the second property value among all properties of the predefined number of candidate incidents in the candidate incidents pool; and
calculating the assigned similarity score for the first candidate incident based on a product of the first probability value and the second probability value.

14. The method of claim 9, further comprising:
ranking the predefined number of candidate incidents in the candidate incidents pool based on the assigned similarity score for each of the predefined number of candidate incidents in the candidate incidents pool;
sorting equally ranked candidate incidents in the ranking based on an amount of time between generation of the subject incident and generation of each of the equally ranked candidate incidents; and
identifying the subset of candidate incidents from the candidate incidents pool based on the ranking.

15. A non-transitory computer-readable medium on which is stored computer-readable instructions that, when executed by a processor, cause the processor to:
receive event data for a subject incident;
filter a set of candidate incidents based on a first property type to identify a first predefined number of candidate incidents correlated to the first property type;
filter the set of candidate incidents based on a second property type to identify a second predefined number of candidate incidents correlated to the second property type, the first predefined number of candidate incidents and the second predefined number of candidate incidents forming a candidate incidents pool;
assign a respective similarity score to each of the candidate incidents in the candidate incidents pool, each of the similarity scores being based on a probability value for each property among property values of the candidate incidents in the candidate incidents pool being similar to the subject incident, wherein the respective similarity score is inversely proportional to the probability value; and
identify a subset of candidate incidents from the candidate incidents pool based on a ranking according to the assigned similarity scores of the candidate incidents in the candidate incidents pool.

16. The computer-readable medium of claim 15, wherein the instructions cause the processor to:
calculate respective first similarity scores for the first predefined number of candidate incidents correlated to the first property type, the first similarity score of a candidate incident being based on a probability value of the first property type between the subject incident and the candidate incident; and
filter the set of candidate incidents to identify the first predefined number of candidate incidents using the calculated first similarity scores.

17. The computer-readable medium of claim 15, wherein the instructions cause the processor to:
determine a first property value and a second property value as being common property values between the subject incident and a first candidate incident among the candidate incidents pool;
calculate a first probability value for presence of the first property value among all property values of the candidate incidents in the candidate incidents pool;
calculate a second probability value for presence of the second property value among all property values of the candidate incidents in the candidate incidents pool; and
calculate the assigned similarity score for the first candidate incident based on a product of the first probability value and the second probability value.

* * * * *